United States Patent
Kuhara

(10) Patent No.: US 10,665,889 B2
(45) Date of Patent: May 26, 2020

(54) ELECTRODE STACK AND BATTERY MANUFACTURING METHOD

(71) Applicant: TOYOTA JIDOSHA KABUSHIKI KAISHA, Toyota-shi, Aichi-ken (JP)

(72) Inventor: Takahiro Kuhara, Toyota (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 226 days.

(21) Appl. No.: 15/961,962

(22) Filed: Apr. 25, 2018

(65) Prior Publication Data

US 2018/0316042 A1 Nov. 1, 2018

(30) Foreign Application Priority Data

Apr. 28, 2017 (JP) .................. 2017-089367

(51) Int. Cl.
| | | |
|---|---|---|
| H01M 10/04 | (2006.01) | |
| H01M 10/0585 | (2010.01) | |
| H01M 4/139 | (2010.01) | |
| H01M 2/16 | (2006.01) | |
| H01M 10/0525 | (2010.01) | |

(52) U.S. Cl.
CPC ....... *H01M 10/0468* (2013.01); *H01M 2/168* (2013.01); *H01M 4/139* (2013.01); *H01M 10/0413* (2013.01); *H01M 10/0585* (2013.01); *B32B 2457/10* (2013.01); *H01M 10/0525* (2013.01); *H01M 2220/20* (2013.01)

(58) Field of Classification Search
CPC ......... H01M 10/0413; H01M 10/0468; H01M 10/0525; H01M 10/0585; H01M 2220/20; H01M 2/168; H01M 4/139
See application file for complete search history.

(56) References Cited

U.S. PATENT DOCUMENTS

| 2014/0363727 A1 | 12/2014 | Ko et al. | |
|---|---|---|---|
| 2015/0056485 A1 | 2/2015 | Kang | |
| 2016/0036087 A1 | 2/2016 | Na et al. | |
| 2016/0149185 A1* | 5/2016 | Yoon .................. | H01M 2/145 |
| | | | 429/144 |
| 2016/0204406 A1* | 7/2016 | Ryu ..................... | H01M 2/162 |
| | | | 429/144 |

FOREIGN PATENT DOCUMENTS

| JP | 2014-086265 A | 5/2014 |
|---|---|---|
| JP | 2015-043311 A | 3/2015 |
| JP | 2015-531155 A | 10/2015 |
| JP | 2015-531989 A | 11/2015 |

* cited by examiner

*Primary Examiner* — Basia A Ridley
*Assistant Examiner* — Heng M. Chan
(74) *Attorney, Agent, or Firm* — Sughrue Mion, PLLC

(57) ABSTRACT

Provided is an electrode stack formed by integrating a first separator, a first electrode plate, a second separator, and a second electrode plate. The first separator has a first separator body, and a first bonding layer that is formed on a principal surface of the first separator body and contains first polyethylene particles. The second separator has a second separator body, and a second bonding layer that is formed on a principal surface of the second separator body and contains second polyethylene particles. The number of particles of the first polyethylene particles per unit area of the first bonding layer is larger than the number of particles of the second polyethylene particles per unit area of the second bonding layer.

6 Claims, 9 Drawing Sheets

ELECTRODE STACK AND BATTERY MANUFACTURING METHOD

INCORPORATION BY REFERENCE

The disclosure of Japanese Patent Application No. 2017-089367 filed on Apr. 28, 2017 including the specification, drawings and abstract is incorporated herein by reference in its entirety.

BACKGROUND

1. Technical Field

The present disclosure relates to an electrode stack having a first separator, a first electrode plate, a second separator, and a second electrode plate stacked in this order and integrated, and to a manufacturing method of a battery including a stacked electrode assembly formed by stacking a plurality of such electrode stacks.

2. Description of Related Art

A stacked electrode assembly formed by alternately stacking pluralities of positive electrode plates and negative electrode plates having rectangular shapes etc. with a separator therebetween is known as a type of an electrode assembly of a battery such as a lithium-ion secondary battery. For example, such a stacked electrode assembly is manufactured by the following method: A first separator and a second separator are bonded respectively to both principal surfaces of a negative electrode plate to form a composite body of the negative electrode plate, the first separator, and the second separator. This composite body and a positive electrode plate are bonded together to form an electrode stack having the first separator, the negative electrode plate, the second separator, and the positive electrode plate stacked in this order and integrated. Then, electrode stacks are placed on top of each other and bonded together by pressing to form an electrode assembly in which a plurality of electrode stacks is stacked. Thus, the aforementioned stacked electrode assembly is produced. Examples of techniques related to a stacked electrode assembly include Published Japanese Translation of PCT Application No. 2015-531989 (see claim 1 etc. of this literature).

SUMMARY

When a high contact pressure is required to press and bond together electrode stacks placed on top of each other, it is necessary to employ a large-sized press apparatus or reduce the production rate, which tends to cause an increase in the manufacturing costs of the electrode assembly and the battery. This makes it difficult to realize an inexpensive battery.

The present disclosure provides an electrode stack and a battery manufacturing method that make it possible to reduce the manufacturing costs of an electrode assembly and a battery and realize an inexpensive battery.

A first aspect of the present disclosure is an electrode stack having a first separator, a first electrode plate, a second separator, and a second electrode plate stacked in this order and integrated. The first separator has a first separator body including a porous membrane, and a porous first bonding layer that is formed on a principal surface of the first separator body, the principal surface of the first separator body being on an opposite side of the first separator body from the first electrode plate, the porous first bonding layer containing first polyethylene particles and a binding agent that binds the first polyethylene particles with each other as well as binds the first polyethylene particles and the first separator body with each other. The second separator has a second separator body including a porous membrane, and a porous second bonding layer that is formed on a principal surface of the second separator body, the principal surface of the second separator body being on an opposite side of the second separator body from the first electrode plate and bonded to the second electrode plate, the porous second bonding layer containing second polyethylene particles and the binding agent that binds the second polyethylene particles with each other as well as binds the second polyethylene particles and the second separator body with each other. The number of particles of the first polyethylene particles per unit area of the first bonding layer is larger than the number of particles of the second polyethylene particles per unit area of the second bonding layer.

In this electrode stack, the number of particles of the first polyethylene particles per unit area of the first bonding layer is set to be larger than the number of particles of the second polyethylene particles per unit area of the second bonding layer. The present inventors have conducted a study on the process of forming an electrode assembly by stacking electrode stacks, in which a first bonding layer of a first separator of one electrode stack is placed on a second electrode plate of another electrode stack, and these electrode stacks are pressed so as to be bonded together through the first bonding layer. Our findings are as follows: Setting the number of particles of the first polyethylene particles per unit area of the first bonding layer to be larger results in the first polyethylene particles of the first bonding layer and the second electrode plate making contact with each other at a larger number of points, which enhances the bonding strength between the first bonding layer and the second electrode plate.

On the other hand, when the number of particles of the first polyethylene particles per unit area of the first bonding layer is held constant, the bonding strength of the first bonding layer increases according to the contact pressure applied to bond together the electrode stacks. Specifically, when this contact pressure is higher, the first polyethylene particles of the first bonding layer undergo more deformation, resulting in a larger contact area between the first bonding layer and the second electrode plate and in greater bonding strength between the first bonding layer and the second electrode plate. Conversely, when this contact pressure is lower, the first polyethylene particles undergo less deformation, resulting in a smaller contact area between the first bonding layer and the second electrode plate and in weaker bonding strength between the first bonding layer and the second electrode plate.

In the above electrode stack, the number of particles of the first polyethylene particles per unit area of the first bonding layer is larger than the number of particles in the second bonding layer, so that, when the electrode stacks are bonded together through the first bonding layer as described above, the first polyethylene particles of the first bonding layer and the second electrode plate make contact with each other at a large number of points, and the first bonding layer exerts greater bonding strength than the second bonding layer. Therefore, even when the contact pressure applied to press and bond together the electrode stacks is reduced, the first bonding layer and the second electrode plate can be appropriately bonded together. Thus, it is possible to downsize a press apparatus that presses and bonds together electrode stacks or increase the production rate, and thereby to reduce the manufacturing costs of the electrode assembly and the battery and realize an inexpensive battery.

For example, an acrylic binding agent can be used as the binding agent for the first bonding layer and the second bonding layer.

In the above electrode stack, the average particle size of the first polyethylene particles may be smaller than the average particle size of the second polyethylene particles.

In this electrode stack, the average particle size of the first polyethylene particles of the first bonding layer is set to be smaller than the average particle size of the second polyethylene particles of the second bonding layer. Thus, it is easy to dispose a large number of first polyethylene particles per unit area in the first bonding layer, and to provide the first bonding layer containing a large number of particles of the first polyethylene particles per unit area. The average particle size of the polyethylene particles is measured by particle size analysis (JISZ8825).

In the above electrode stack, the average particle size of the first polyethylene particles may be 0.3 µm to 1.0 µm, and the average particle size of the second polyethylene particles may be 2.0 µm to 4.0 µm.

In this electrode stack, the average particle size of the first polyethylene particles of the first bonding layer is set to 0.3 µm to 1.0 µm, which makes it easy to handle the first polyethylene particles and to provide the first bonding layer using these first polyethylene particles. Moreover, the average particle size of the second polyethylene particles of the second bonding layer is set to 2.0 µm to 4.0 µm, which makes it easy to handle the second polyethylene particles and to provide the second bonding layer using these second polyethylene particles.

Another aspect of the present disclosure is a battery manufacturing method. The battery includes a stacked electrode assembly that is formed by stacking a plurality of electrode stacks each having a first separator, a first electrode plate, a second separator, and a second electrode plate stacked in this order and integrated. The first separator has a first separator body including a porous membrane, and a porous first bonding layer that is formed on a principal surface of the first separator body, the principal surface of the first separator body being on an opposite side of the first separator body from the first electrode plate, the porous first bonding layer containing first polyethylene particles and a binding agent that binds the first polyethylene particles with each other as well as binds the first polyethylene particles and the first separator body with each other. The second separator has a second separator body including a porous membrane, and a porous second bonding layer that is formed on a principal surface of the second separator body, the principal surface of the second separator body being on an opposite side of the second separator body from the first electrode plate and bonded to the second electrode plate, the porous second bonding layer containing second polyethylene particles and the binding agent that binds the second polyethylene particles with each other as well as binds the second polyethylene particles and the second separator body with each other. The number of particles of the first polyethylene particles per unit area of the first bonding layer is larger than the number of particles of the second polyethylene particles per unit area of the second bonding layer. The battery manufacturing method includes: forming a band-shaped composite body having a band-shaped first separator, a band-shaped first electrode plate, and a band-shaped second separator that are to be respectively cut into the first separator, the first electrode plate, and the second separator, stacked in this order and integrated; producing a band-shaped electrode stack by placing the band-shaped composite body and the second electrode plate, with the second bonding layer of the band-shaped second separator of the band-shaped composite body and the second electrode plate on top of each other, and roller-pressing the band-shaped composite body and the second electrode plate so as to bond together the band-shaped composite body and the second electrode plate; forming the electrode stack of a predetermined shape by cutting the band-shaped electrode stack; and forming the electrode assembly by repeating a process of placing one electrode stack on another electrode stack, with the first bonding layer of the first separator of the one electrode stack on top of the second electrode plate of the other electrode stack, and flat-pressing the one electrode stack and the other electrode stack so as to bond the one electrode stack to the other electrode stack.

This battery manufacturing method uses roller pressing as described above to bond together the band-shaped composite body and the second electrode plate through the second bonding layer, in the process of producing the band-shaped electrode stack by roller-pressing the band-shaped composite body and the second electrode plate and bonding together the band-shaped composite body and the second electrode plate. Since the number of particles of the second polyethylene particles per unit area of the second bonding layer is smaller than the number of particles in the first bonding layer, a large pressing force is required to appropriately bond together the band-shaped composite body and the second electrode plate. However, roller pressing can easily apply a larger pressing force than flat pressing to the band-shaped composite body and the second electrode plate. Thus, the band-shaped composite body and the second electrode plate can be appropriately bonded together by roller pressing.

On the other hand, this battery manufacturing method uses flat pressing as described above to bond together the electrode stacks through the first bonding layer, in the process of forming the electrode assembly by repeatedly flat-pressing the electrode stacks and bonding one electrode stack to the other electrode stack. Having a number of particles of the first polyethylene particles per unit area that is larger than the number of particles in the second bonding layer, the first bonding layer can form an adequate bond even when the pressing force is reduced from that applied to bond together the band-shaped composite body and the second electrode plate, and therefore electrode stacks can be appropriately bonded together by flat pressing. Thus, it is possible to downsize a press apparatus that performs flat pressing or increase the production rate, and thereby to reduce the manufacturing costs of the electrode assembly and the battery and realize an inexpensive battery.

In the above battery manufacturing method, the average particle size of the first polyethylene particles may be smaller than the average particle size of the second polyethylene particles.

In this battery manufacturing method, the average particle size of the first polyethylene particles of the first bonding layer is set to be smaller than the average particle size of the second polyethylene particles of the second bonding layer. Thus, it is easy to dispose a large number of first polyethylene particles per unit area in the first bonding layer, and to provide the first bonding layer containing a large number of particles of the first polyethylene particles per unit area.

In the above battery manufacturing method, the average particle size of the first polyethylene particles may be 0.3 µm to 1.0 µm, and the average particle size of the second polyethylene particles may be 2.0 µm to 4.0 µm.

In this battery manufacturing method, the average particle size of the first polyethylene particles of the first bonding layer is set to 0.3 μm to 1.0 μm, which makes it easy to handle the first polyethylene particles and to provide the first bonding layer using these first polyethylene particles. Moreover, the average particle size of the second polyethylene particles of the second bonding layer is set to 2.0 μm to 4.0 μm, which makes it easy to handle the second polyethylene particles and to provide the second bonding layer using these second polyethylene particles.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Figure 1:
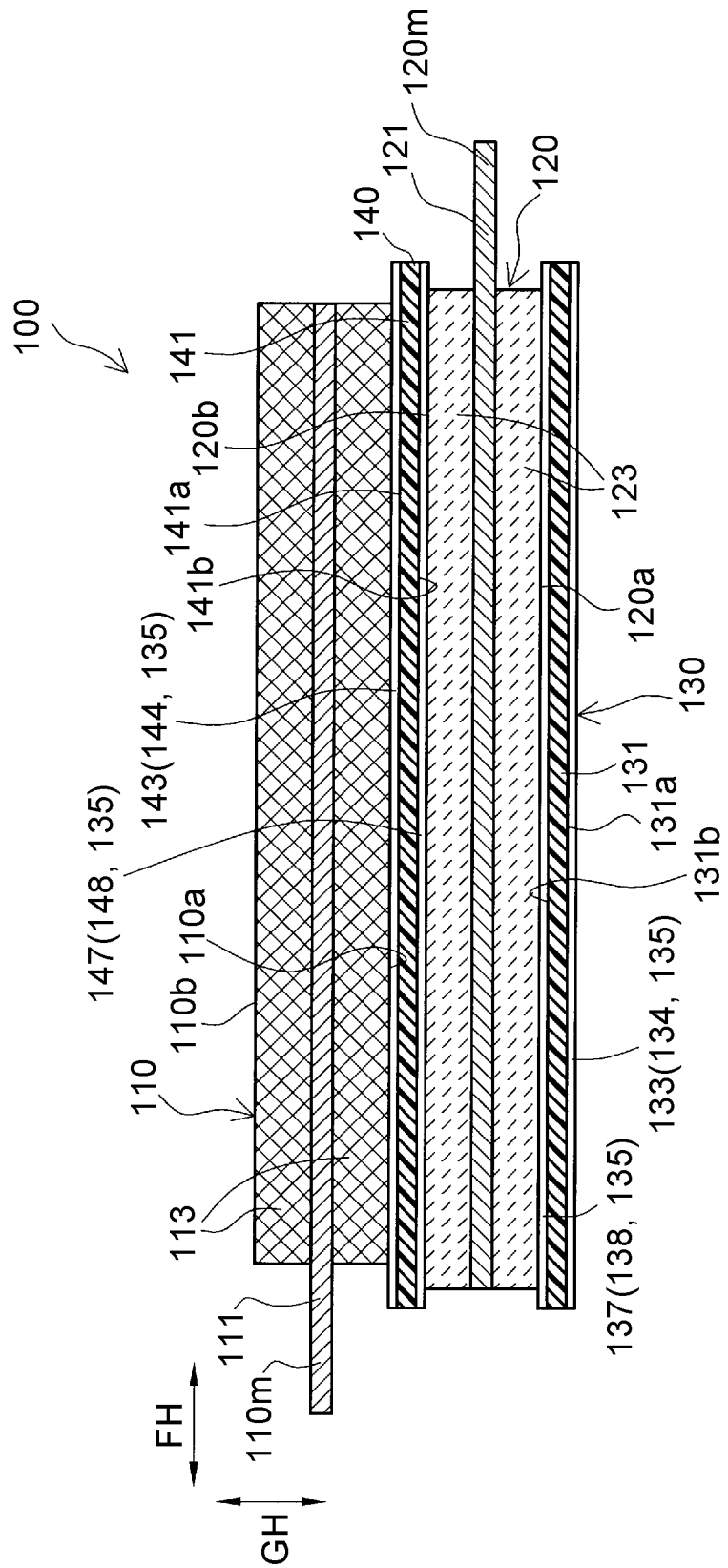
FIG. 1 is a sectional view of an electrode stack according to an embodiment.
Figure 2:
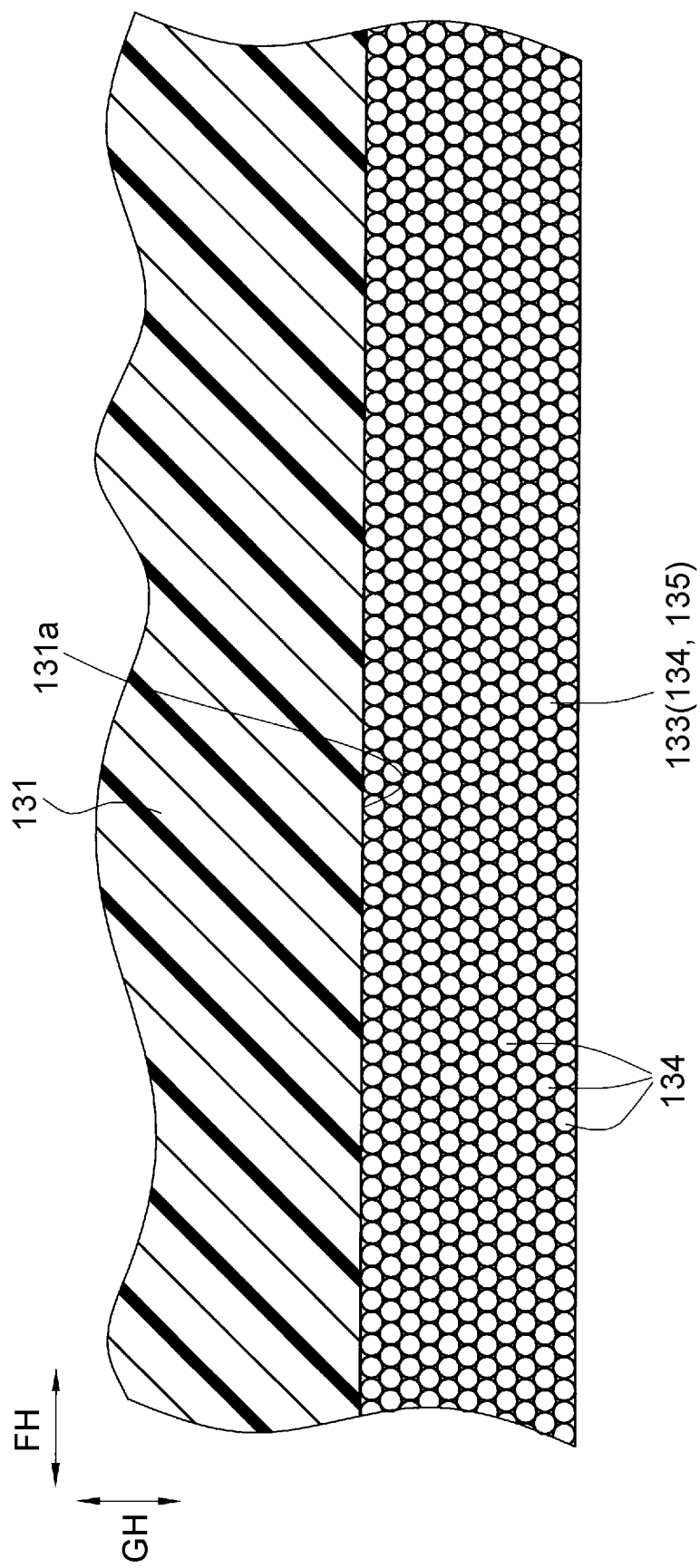
FIG. 2 is a partially enlarged sectional view of the electrode stack according to the embodiment, showing a first bonding layer and its vicinity.
Figure 3:
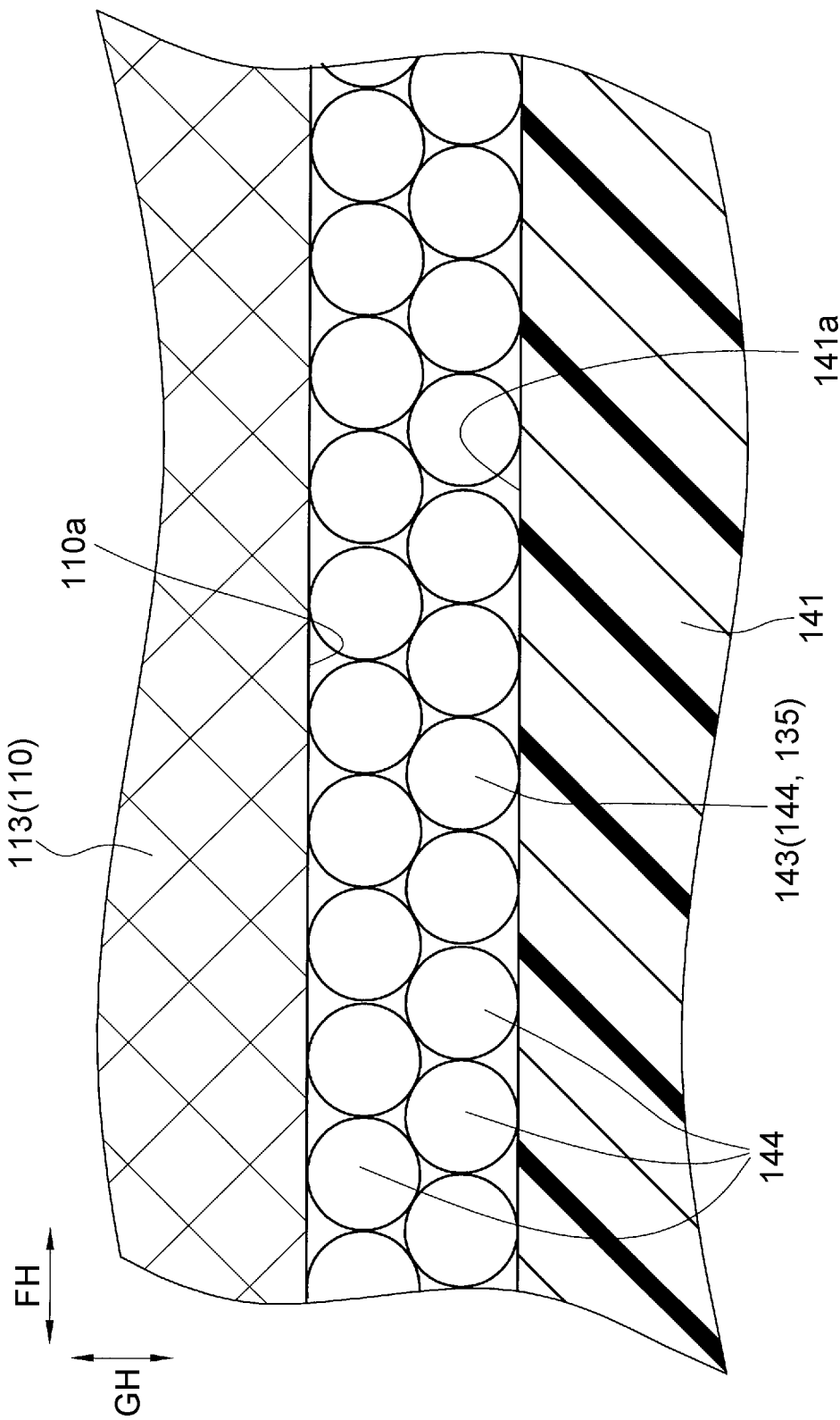
FIG. 3 is a partially enlarged sectional view of the electrode stack according to the embodiment, showing a second bonding layer and its vicinity.
Figure 4:
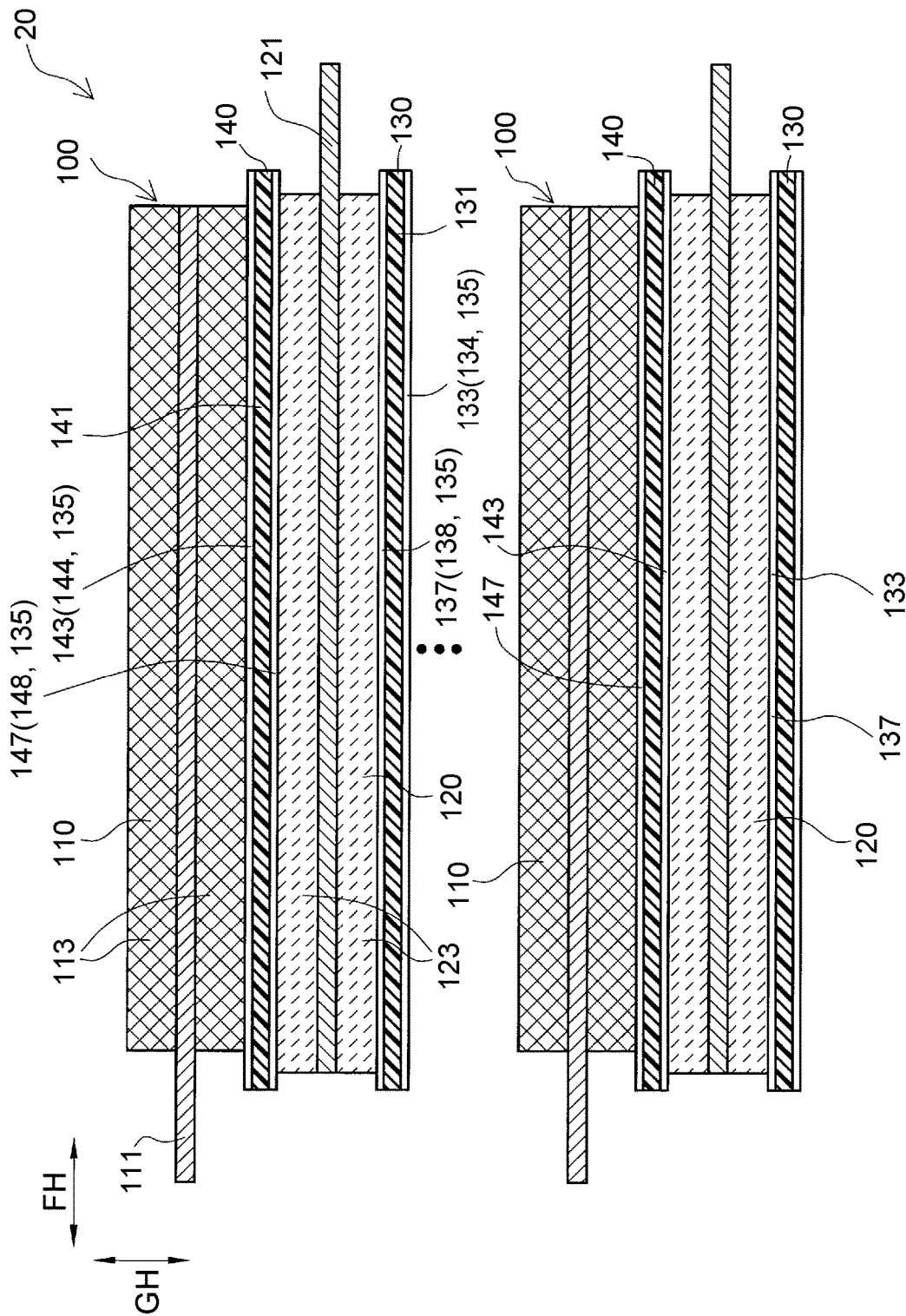
FIG. 4 is a sectional view of an electrode assembly according to the embodiment.
Figure 5:
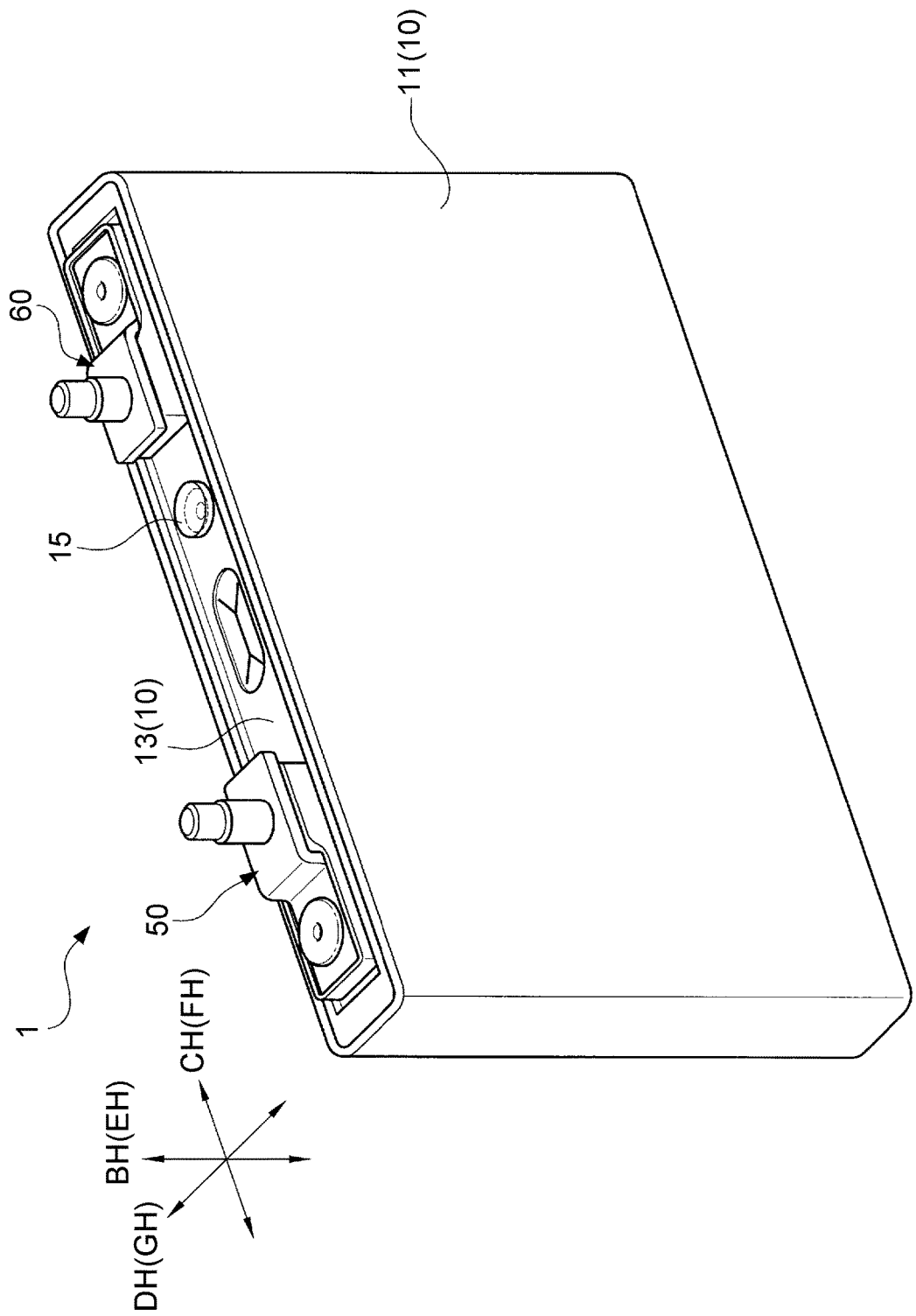
FIG. 5 is a perspective view of a battery according to the embodiment.
Figure 6:
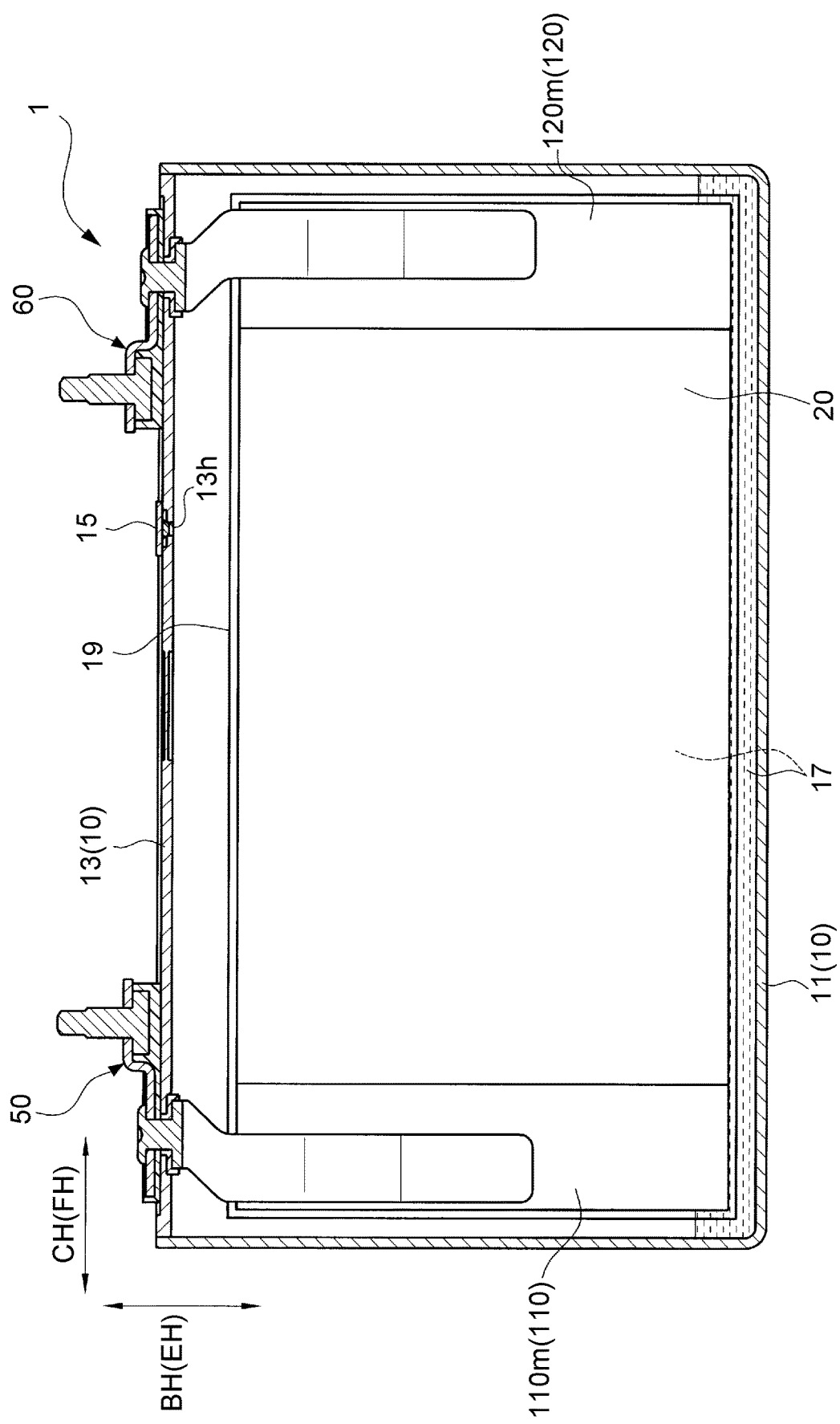
FIG. 6 is a sectional view of the battery according to the embodiment.

An embodiment of the present disclosure will be described below with reference to the drawings. FIG. 1 is a sectional view of an electrode stack 100 according to the embodiment. FIG. 2 is a partially enlarged sectional view of the electrode stack 100, showing a first bonding layer 133 and its vicinity, and FIG. 3 is a partially enlarged sectional view thereof, showing a second bonding layer 143 and its vicinity. FIG. 4 shows an electrode assembly 20 formed by stacking a plurality of electrode stacks 100. FIG. 5 and FIG. 6 are respectively a perspective view and a sectional view of a battery 1 including the electrode assembly 20. For the following description, a short-side direction EH, a long-side direction FH, and a thickness direction GH of the electrode stack 100 are defined as the directions indicated in FIG. 1 to FIG. 6. Moreover, for the following description, a battery short-side direction BH, a battery long-side direction CH, and a battery thickness direction DH of the battery 1 are defined as the directions indicated in FIG. 5 and FIG. 6.

The electrode stack 100 (see FIG. 1) has a first separator 130, a negative electrode plate (first electrode plate) 120, a second separator 140, and a positive electrode plate (second electrode plate) 110 stacked in this order and integrated. The positive electrode plate 110 has a shape of a rectangular plate with a first positive electrode principal surface 110a and a second positive electrode principal surface 110b, and is composed of a positive electrode current collector foil 111 that is a rectangular aluminum foil, and rectangular positive electrode active material layers 113 provided respectively on both principal surfaces of the positive electrode current collector foil 111. The positive electrode active material layers 113 each contain a positive electrode active material, an electrically conductive material, and a binding agent. An end of the positive electrode plate 110 on the left side in FIG. 1 has no positive electrode active material layer 113 formed thereon in the thickness direction (the vertical direction in FIG. 1), and thus forms an exposed positive electrode portion 110m that is a portion of the positive electrode current collector foil 111 exposed in the thickness direction.

The negative electrode plate 120 has a shape of a rectangular plate with a first negative electrode principal surface 120a and a second negative electrode principal surface 120b, and is composed of a negative electrode current collector foil 121 that is a rectangular copper foil, and rectangular negative electrode active material layers 123 provided respectively on both principal surfaces of the negative electrode current collector foil 121. The negative electrode active material layers 123 each contain a negative electrode active material, a binding agent, and a thickening agent. An end of the negative electrode plate 120 on the right side in FIG. 1 has no negative electrode active material layer 123 formed thereon in the thickness direction (the vertical direction in FIG. 1), and thus forms an exposed negative electrode portion 120m that is a portion of the negative electrode current collector foil 121 exposed in the thickness direction.

The first separator 130 is bonded to the first negative electrode principal surface 120a of the negative electrode plate 120. The first separator 130 includes a rectangular plate-shaped first separator body 131, the porous first bonding layer 133 that is formed over the entire first principal surface 131a of the first separator body 131 on the lower side in FIG. 1 (the entire first principal surface 131a of the first separator body 131 being the opposite side of the first separator body 131 from the negative electrode plate 120), and a porous third bonding layer 137 that is formed over the entire second principal surface 131b of the first separator body 131 on the upper side in FIG. 1 (the side of the negative electrode plate 120).

The first separator body 131 is a porous membrane containing polyethylene and having a thickness of 10 μm to 30 μm (in this embodiment, 20 μm). The first bonding layer 133 (see FIG. 2 in addition to FIG. 1) is a porous layer having a thickness of 5 μm, and containing first polyethylene particles 134 with an average particle size D1 (in this embodiment, D1=0.6 μm) and a binding agent (in this embodiment, an acrylic binding agent) 135 that binds the first polyethylene particles 134 with each other as well as binds the first polyethylene particles 134 and the first separator body 131 with each other. The binding agent 135 is not shown in FIG. 2. The average particle size D1 of the first polyethylene particles 134, and average particle sizes D3, D2, D4 of third polyethylene particles 138, second polyethylene particles 144, and fourth polyethylene particles 148 to be described later, respectively, are measured by particle size analysis (JISZ8825).

The first bonding layer 133 contains 95 wt % of the first polyethylene particles 134 and 5 wt % of the binding agent 135. Similarly, each of the third bonding layer 137, the second bonding layer 143, and a fourth bonding layer 147 to be described later contains 95 wt % of the polyethylene particles (the third polyethylene particles 138, the second polyethylene particles 144, and the fourth polyethylene particles 148) and 5 wt % of the binding agent 135. In this embodiment, a number of particles N1 of the first polyethylene particles 134 per unit area of the first bonding layer 133 is $2.7 \times 10^8$ particles/cm$^2$, which is larger than a number of particles N2 (in this embodiment, N2=$1.1 \times 10^7$ particles/cm$^2$) of the second polyethylene particles 144 per unit area of the second bonding layer 143 to be described later (N1>N2) (see FIG. 2 and FIG. 3).

On the other hand, the third bonding layer 137 is a porous layer having a thickness of 5 μm, and containing the third polyethylene particles 138 with the average particle size D3 (in this embodiment, D3=3.0 μm) and the binding agent 135 that binds the third polyethylene particles 138 with each other as well as binds the third polyethylene particles 138 and the first separator body 131 with each other. The third bonding layer 137 is bonded to the first negative electrode principal surface 120a of the negative electrode plate 120, and the first separator 130 and the negative electrode plate 120 are bonded together through the third bonding layer 137. In this embodiment, a number of particles N3 of the third polyethylene particles 138 per unit area of the third bonding layer 137 is $1.1 \times 10^7$ particles/cm$^2$.

The second separator 140 is interposed between the negative electrode plate 120 and the positive electrode plate 110, and is bonded to the second negative electrode principal surface 120b of the negative electrode plate 120 as well as to the first positive electrode principal surface 110a of the positive electrode plate 110. The second separator 140 includes a rectangular plate-shaped second separator body 141, the porous second bonding layer 143 that is formed over the entire first principal surface 141a of the second separator body 141 on the upper side in FIG. 1 (the entire first principal surface 141a of the second separator body 141 being the opposite side the second separator body 141 from the negative electrode plate 120), and the porous fourth bonding layer 147 that is formed over the entire second principal surface 141b of the second separator body 141 on the lower side in FIG. 1 (the side of the negative electrode plate 120).

Like the first separator body 131, the second separator body 141 is a porous membrane containing polyethylene and having a thickness of 10 μm to 30 μm (in this embodiment, 20 μm). The second bonding layer 143 (see FIG. 3 in addition to FIG. 1) is a porous membrane having a thickness of 5 μm, and containing the second polyethylene particles 144 with the average particle size D2 (in this embodiment, D2=3.0 μm) and the binding agent 135 that binds the second polyethylene particles 144 with each other as well as binds the second polyethylene particles 144 and the second separator body 141 with each other. The binding agent 135 is not shown in FIG. 3. The second bonding layer 143 is bonded to the first positive electrode principal surface 110a of the positive electrode plate 110, and the second separator 140 and the positive electrode plate 110 are bonded together through the second bonding layer 143. In this embodiment, the number of particles N2 of the second polyethylene particles 144 per unit area of the second bonding layer 143 is $1.1 \times 10^7$ particles/cm$^2$.

The fourth bonding layer 147 is a porous layer having a thickness of 5 μm, and containing the fourth polyethylene particles 148 with the average particle size D4 (in this embodiment, D4=3.0 μm) and the binding agent 135 that binds the fourth polyethylene particles 148 with each other as well as binds the fourth polyethylene particles 148 and the second separator body 141 with each other. The fourth bonding layer 147 is bonded to the second negative electrode principal surface 120b of the negative electrode plate 120, and the second separator 140 and the negative electrode plate 120 are bonded together through the fourth bonding layer 147. In this embodiment, a number of particles N4 of the fourth polyethylene particles 148 per unit area of the fourth bonding layer 147 is $1.1 \times 10^7$ particles/cm$^2$.

Next, the electrode assembly 20 and the battery 1 manufactured using the electrode stack 100 will be described (see FIG. 4 to FIG. 6). The electrode assembly 20 has a substantially rectangular parallelepiped shape, and is formed by stacking and integrating a plurality of the aforementioned electrode stacks 100. Specifically, the electrode stacks 100 are stacked in the thickness direction GH, with the first bonding layer 133 of the first separator 130 of one electrode stack 100 bonded to the positive electrode plate 110 of another electrode stack 100. Thus, a stacked electrode assembly having pluralities of rectangular positive electrode plates 110 and negative electrode plates 120 alternately stacked with the separator (the first separator 130 or the second separator 140) therebetween is formed. The electrode assembly 20 is housed inside a rectangular sealed lithium-ion secondary battery 1 (hereinafter also referred to simply as a "battery") that is installed in a vehicle such as a hybrid car, a plug-in hybrid car, or an electric vehicle.

The battery 1 includes a battery case 10, the electrode assembly 20 housed inside the battery case 10, and a positive electrode terminal member 50 and a negative electrode terminal member 60 supported on the battery case 10. An electrolyte 17 is housed inside the battery case 10, and the electrode assembly 20 is impregnated with part of the electrolyte 17. The battery case 10 has a shape of a rectangular box and contains metal (in this embodiment, aluminum). The battery case 10 is composed of a closed-bottomed rectangular tubular case body member 11 that is open only at the top, and a rectangular plate-shaped case lid member 13 that is welded so as to close the opening of the case body member 11.

The positive electrode terminal member 50 containing aluminum is fixed on the case lid member 13 while insulated from the case lid member 13. The positive electrode terminal member 50 is conductively connected to the exposed positive electrode portion 110m of each positive electrode plate 110 of the electrode assembly 20 inside the battery case 10, while extending through the case lid member 13 to the outside of the battery. The negative electrode terminal member 60 containing copper is fixed on the case lid member 13 while being insulated from the case lid member 13. The negative electrode terminal member 60 is conductively connected to the exposed negative electrode portion 120m of each negative electrode plate 120 of the electrode assembly 20 inside the battery case 10, while extending through the case lid member 13 to the outside of the battery. A bag-shaped insulating film enclosure 19 that is an insulating film is disposed between the electrode assembly 20 and the battery case 10.

In the electrode stack 100 of this embodiment, as has been described above, the number of particles N1 of the first polyethylene particles 134 per unit area of the first bonding layer 133 is set to be larger than the number of particles N2 of the second polyethylene particles 144 per unit area of the second bonding layer 143 (N1>N2). As will be described later, in the process of forming the electrode assembly 20 by stacking the electrode stacks 100, in which the first bonding layer 133 of the first separator 130 of one electrode stack 100 is placed on the positive electrode plate 110 of another electrode stack 100 and these electrode stacks 100 are pressed so as to be bonded together through the first bonding layer 133, setting the number of particles N1 per unit area of the first bonding layer 133 to be larger results in the first polyethylene particles 134 of the first bonding layer 133 and the positive electrode plate 110 making contact with each other at a larger number of points, which enhances the bonding strength between the first bonding layer 133 and the positive electrode plate 110.

On the other hand, as will be described later, when the number of particles N1 per unit area of the first bonding layer 133 is held constant, the bonding strength of the first bonding layer 133 increases according to the contact pressure applied to bond together the electrode stacks 100. Specifically, when this contact pressure is higher, the first polyethylene particles 134 of the first bonding layer 133 undergo more deformation, resulting in a larger contact area between the first bonding layer 133 and the positive electrode plate 110 and in greater bonding strength between the first bonding layer 133 and the positive electrode plate 110. Conversely, when this contact pressure is lower, the first polyethylene particles 134 undergo less deformation, resulting in a smaller contact area between the first bonding layer 133 and the positive electrode plate 110 and in weaker bonding strength between the first bonding layer 133 and the positive electrode plate 110.

In the electrode stack 100 of this embodiment, the number of particles N1 of the first polyethylene particles 134 per unit area of the first bonding layer 133 is larger than the number of particles in the second bonding layer 143, so that, when the electrode stacks 100 are bonded together through the first bonding layer 133, the first polyethylene particles 134 of the first bonding layer 133 and the positive electrode plate 110 make contact with each other at a large number of points, and the first bonding layer 133 exerts greater bonding strength than the second bonding layer 143. Therefore, even when the contact pressure applied to press and bond together the electrode stacks 100 is reduced, the first bonding layer 133 and the positive electrode plate 110 can be appropriately bonded together. Thus, it is possible to downsize a flat pressing unit 270 to be described later (see FIG. 8) that presses and bonds together the electrode stacks 100 or increase the production rate, and thereby to reduce the manufacturing costs of the electrode assembly 20 and the battery 1 and realize an inexpensive battery 1.

In the electrode stack 100 of this embodiment, the average particle size D1 of the first polyethylene particles 134 of the first bonding layer 133 is set to be smaller than the average particle size D2 of the second polyethylene particles 144 of the second bonding layer 143 (D1<D2). Thus, as will be described later, it is easy to dispose a large number of first polyethylene particles 134 per unit area in the first bonding layer 133, and to provide the first bonding layer 133 containing a large number of particles N1 of the first polyethylene particles 134 per unit area.

In the electrode stack 100 of this embodiment, the average particle size D1 of the first polyethylene particles 134 of the first bonding layer 133 is set to 0.3 µm to 1.0 µm, which makes it easy to handle the first polyethylene particles 134 and to provide the first bonding layer 133 using the first polyethylene particles 134, as will be described later. Moreover, the average particle size D2 of the second polyethylene particles 144 of the second bonding layer 143 is set to 2.0 µm to 4.0 µm, which makes it easy to handle the second polyethylene particles 144 and to provide the second bonding layer 143 using the second polyethylene particles 144, as will be described later.

Figure 7:
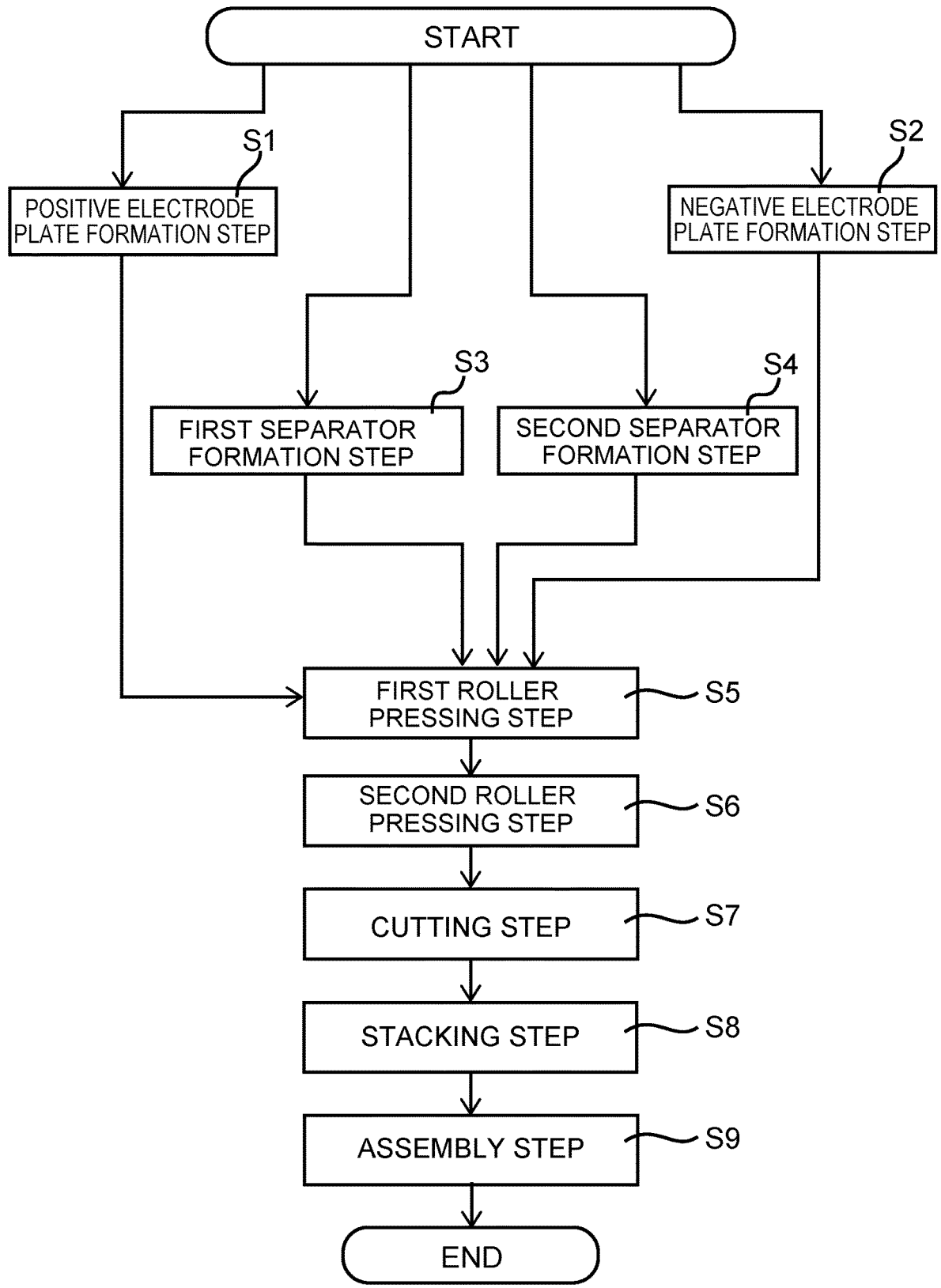
FIG. 7 is a flowchart of a battery manufacturing method according to the embodiment.
Figure 8:
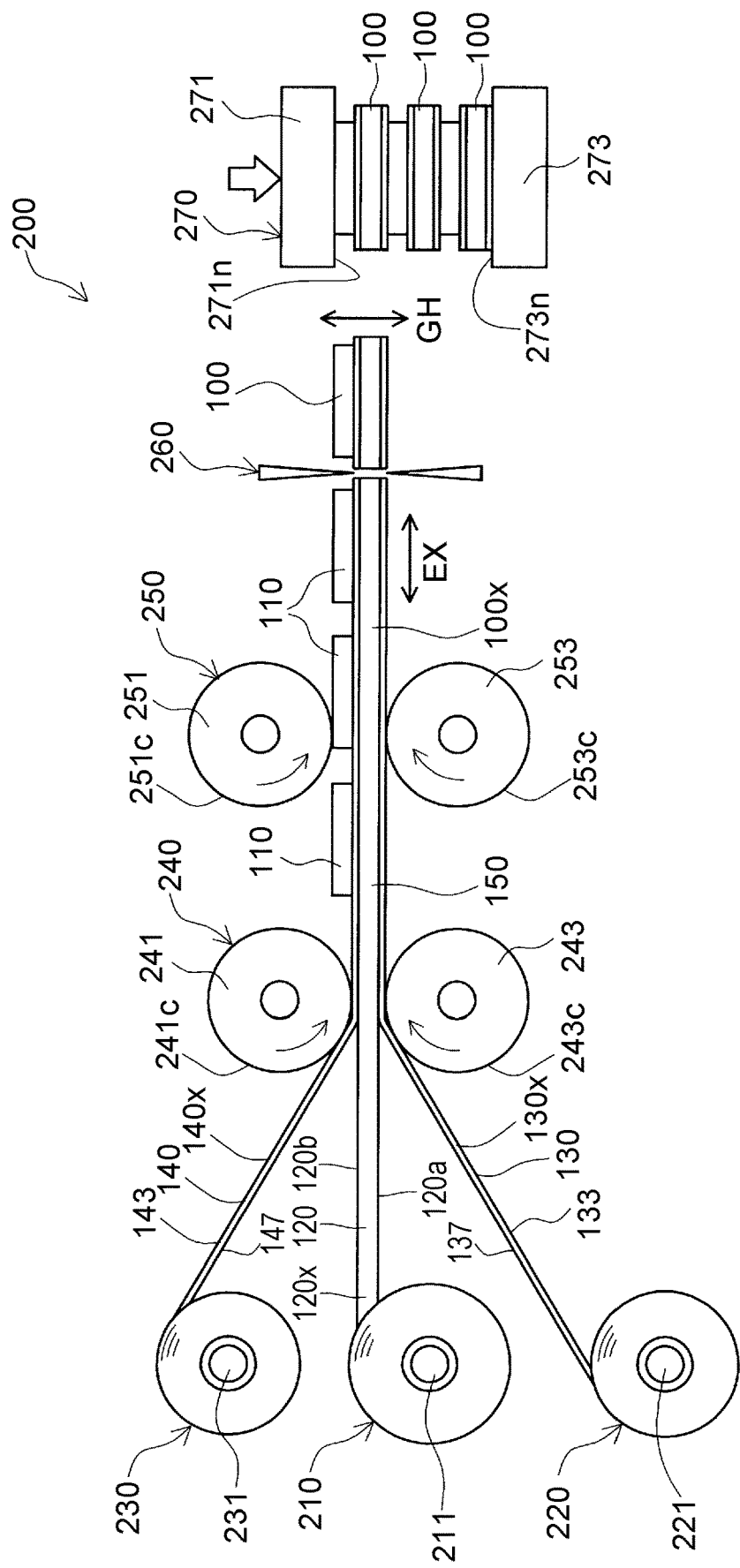
FIG. 8 is a view illustrating how an electrode assembly is formed according to the embodiment.

Next, a manufacturing method of the battery 1 will be described (see FIG. 7 and FIG. 8). First, in a positive electrode plate formation step S1, a band-shaped positive electrode plate to be cut into the positive electrode plate 110 is formed. Specifically, the positive electrode current collector foil 111 that is a band-shaped aluminum foil is prepared. A positive electrode paste obtained by kneading a positive electrode active material, an electrically conductive material, and a binding agent together with a dispersion medium is applied to one principal surface of the positive electrode current collector foil 111 and heated and dried to form the positive electrode active material layer 113. The same positive electrode paste is also applied to the opposite principal surface of the positive electrode current collector foil 111 and heated and dried to form the positive electrode active material layer 113. Then, the positive electrode plate thus produced is pressed by a roller press machine to increase the density of the positive electrode active material layers 113. Thus, a band-shaped positive electrode plate is formed.

A negative electrode plate formation step S2 is separately performed to form a band-shaped negative electrode plate (band-shaped first electrode plate) 120x to be cut into the negative electrode plate 120. Specifically, the negative electrode current collector foil 121 that is a band-shaped copper foil is prepared. A negative electrode paste obtained by kneading a negative electrode active material, a binding agent, and a thickening agent together with a dispersion medium is applied to one principal surface of the negative electrode current collector foil 121 and heated and dried to form the negative electrode active material layer 123. The same negative electrode paste is also applied to the other principal surface of the negative electrode current collector foil 121 and heated and dried to form the negative electrode active material layer 123. Then, the negative electrode plate thus produced is pressed by a roller press machine to increase the density of the negative electrode active material layers 123. Thus, the band-shaped negative electrode plate 120x is formed.

A first separator formation step S3 is separately performed to form a band-shaped first separator 130x to be cut into the first separator 130. Specifically, the band-shaped first separator body 131 including a polyethylene porous membrane is prepared, and the first bonding layer 133 is formed on the first principal surface 131a of the first separator body 131. More specifically, the first polyethylene particles 134 with the average particle size D1 (in this embodiment, D1=0.6 µm) and the binding agent (in this embodiment, an acrylic binding agent) 135 are dispersed in a dispersion medium (specifically, water), in a ratio of 95 wt % of the first polyethylene particles 134 to 5 wt % of the binding agent 135. Then, the dispersion liquid thus produced is applied to the entire first principal surface 131a of the first separator body 131 and heated and dried to form the first bonding layer 133 having a thickness of 5 µm on the first principal surface 131a.

The number of particles N1 of the first polyethylene particles 134 per unit area of the first bonding layer 133 thus formed is $2.7 \times 10^8$ particles/cm$^2$, which is larger than the number of particles N2 (N2=$1.1 \times 10^7$ particles/cm$^2$) of the second polyethylene particles 144 per unit area of the second bonding layer 143 to be described later (N1>N2) (see FIG. 2 and FIG. 3). Since the average particle size D1 of the first polyethylene particles 134 is set to be smaller than the average particle size D2 of the second polyethylene particles 144 of the second bonding layer 143 to be described later (D1<D2), it is easy to dispose a large number of first polyethylene particles 134 per unit area in the first bonding layer 133, and to provide the first bonding layer 133 containing a large number of particles N1 of the first polyethylene particles 134 per unit area. Moreover, since the average particle size D1 of the first polyethylene particles 134 is set to 0.3 μm to 1.0 μm, it is easy to handle the first polyethylene particles 134 and to provide the first bonding layer 133 using the first polyethylene particles 134.

The third bonding layer 137 is formed on the second principal surface 131b of the first separator body 131. Specifically, the third polyethylene particles 138 with the average particle size D3 (in this embodiment, D3=3.0 μm) and the binding agent 135 are dispersed in the above dispersion medium, in a ratio of 95 wt % of the third polyethylene particles 138 to 5 wt % of the binding agent 135. Then, the dispersion liquid thus produced is applied to the entire second principal surface 131b of the first separator body 131 and heated and dried to form the third bonding layer 137 having a thickness of 5 μm on the second principal surface 131b. The number of particles N3 of the third polyethylene particles 138 per unit area of the third bonding layer 137 thus formed is $1.1 \times 10^7$ particles/cm$^2$. Thus, the band-shaped first separator 130x having the first bonding layer 133 and the third bonding layer 137 on the first separator body 131 is formed (see FIG. 1 etc.).

A second separator formation step S4 is separately performed to form a band-shaped second separator 140x to be cut into the second separator 140. Specifically, the band-shaped second separator body 141 including a polyethylene porous membrane is prepared, and the second bonding layer 143 is formed on the first principal surface 141a of the second separator body 141. More specifically, the second polyethylene particles 144 with the average particle size D2 (in this embodiment, D2=3.0 μm) and the binding agent 135 are dispersed in the above dispersion medium, in a ratio of 95 wt % of the second polyethylene particles 144 to 5 wt % of the binding agent 135. Then, the dispersion liquid thus produced is applied to the entire first principal surface 141a of the second separator body 141 and heated and dried to form the second bonding layer 143 having a thickness of 5 μm on the first principal surface 141a. The number of particles N2 of the second polyethylene particles 144 per unit area of the second bonding layer 143 thus formed is $1.1 \times 10^7$ particles/cm$^2$. In this embodiment, since the average particle size D2 of the second polyethylene particles 144 is set to 2.0 μm to 4.0 μm, it is easy to handle the second polyethylene particles 144 and to provide the second bonding layer 143 using the second polyethylene particles 144.

The fourth bonding layer 147 is formed on the second principal surface 141b of the second separator body 141. Specifically, the fourth polyethylene particles 148 with the average particle size D4 (in this embodiment, D4=3.0 μm) and the binding agent 135 are dispersed in the above dispersion medium, in a ratio of 95 wt % of the fourth polyethylene particles 148 to 5 wt % of the binding agent 135. Then, the dispersion liquid thus produced is applied to the entire second principal surface 141b of the second separator body 141 and heated and dried to form the fourth bonding layer 147 having a thickness of 5 μm on the second principal surface 141b. The number of particles N4 of the fourth polyethylene particles 148 per unit area of the fourth bonding layer 147 thus formed is $1.1 \times 10^7$ particles/cm$^2$ in this embodiment. Thus, the band-shaped second separator 140x having the second bonding layer 143 and the fourth bonding layer 147 on the second separator body 141 is formed (see FIG. 1 etc.).

Next, the band-shaped positive electrode plate, the band-shaped negative electrode plate 120x, the band-shaped first separator 130x, and the band-shaped second separator 140x thus produced are used to form the electrode assembly 20 by an electrode assembly manufacturing apparatus 200. First, the electrode assembly manufacturing apparatus 200 will be described (see FIG. 8). The electrode assembly manufacturing apparatus 200 includes a negative electrode plate feeding unit 210, a first separator feeding unit 220, a second separator feeding unit 230, a first roller pressing unit 240, a second roller pressing unit 250, a cutting unit 260, and a flat pressing unit 270.

The band-shaped negative electrode plate 120x wound around a reel-out roll 211 is mounted on the negative electrode plate feeding unit 210, and the band-shaped negative electrode plate 120x is sent forth in a longitudinal direction thereof (the left-right direction in FIG. 8) from the negative electrode plate feeding unit 210. The first separator feeding unit 220 is disposed below the negative electrode plate feeding unit 210. The band-shaped first separator 130x wound around a reel-out roll 221 is mounted on the first separator feeding unit 220, and the band-shaped first separator 130x is sent forth in a longitudinal direction thereof from the first separator feeding unit 220. The second separator feeding unit 230 is disposed above the negative electrode plate feeding unit 210. The band-shaped second separator 140x wound around a reel-out roll 231 is mounted on the second separator feeding unit 230, and the band-shaped second separator 140x is sent forth in a longitudinal direction thereof from the second separator feeding unit 230.

The first roller pressing unit 240 is a unit that roller-presses and integrates the band-shaped first separator 130x, the band-shaped negative electrode plate 120x, and the band-shaped second separator 140x. Specifically, the first roller pressing unit 240 has a first press roller 241 of which a roller surface 241c is made of stainless steel, and a second press roller 243 which is disposed parallel to the first press roller 241 with a clearance left therebetween and of which a roller surface 243c is made of stainless steel. In the clearance between the first press roller 241 and the second press roller 243, the band-shaped first separator 130x, the band-shaped negative electrode plate 120x, and the band-shaped second separator 140x are pressed and integrated continuously in the longitudinal direction to form a band-shaped composite body 150.

The second roller pressing unit 250 is disposed downstream of the first roller pressing unit 240. The second roller pressing unit 250 is a unit that presses and integrates the band-shaped composite body 150 and the positive electrode plate 110 that has been cut into a rectangular shape. Specifically, the second roller pressing unit 250 has a third press roller 251 of which a roller surface 251c is made of stainless steel, and a fourth press roller 253 which is disposed parallel to the third press roller 251 with a clearance therebetween and of which a roller surface 253c is made of stainless steel. In the clearance between the third press roller 251 and the fourth press roller 253, the band-shaped composite body 150 and the rectangular positive electrode plate 110 are continuously pressed and integrated to form a band-shaped electrode stack 100x.

The cutting unit 260 is disposed downstream of the second roller pressing unit 250. The cutting unit 260 is a unit that cuts the band-shaped electrode stack 100x at predetermined intervals in the longitudinal direction to form the electrode stacks 100 of a predetermined shape (in this embodiment, a rectangular shape).

The flat pressing unit 270 is a unit that flat-presses and integrates a plurality of electrode stacks 100. Specifically, the flat pressing unit 270 has an upper die 271 having a flat press surface 271n, and a lower die 273 having a flat press surface 273n that faces the press surface 271n of the upper die 271.

To form the electrode assembly 20 using the electrode assembly manufacturing apparatus 200, first, in a first roller pressing step S5, the band-shaped composite body 150 having the band-shaped first separator 130x, the band-shaped negative electrode plate 120x, and the band-shaped second separator 140x stacked in this order and integrated is formed. Specifically, the band-shaped negative electrode plate 120x transferred from the negative electrode plate feeding unit 210, the band-shaped first separator 130x transferred from the first separator feeding unit 220, and the band-shaped second separator 140x transferred from the second separator feeding unit 230 each head for the first roller pressing unit 240.

In the clearance between the first press roller 241 and the second press roller 243 of the first roller pressing unit 240, the band-shaped first separator 130x, the band-shaped negative electrode plate 120x, and the band-shaped second separator 140x, with the third bonding layer 137 of the band-shaped first separator 130x placed on the first negative electrode principal surface 120a of the band-shaped negative electrode plate 120x and with the fourth bonding layer 147 of the band-shaped second separator 140x placed on the second negative electrode principal surface 120b of the band-shaped negative electrode plate 120x, are pressed and integrated continuously in the longitudinal direction. As a result, the band-shaped composite body 150 is formed in which the band-shaped first separator 130x and the band-shaped negative electrode plate 120x are bonded together through the third bonding layer 137, as well as the band-shaped second separator 140x and the band-shaped negative electrode plate 120x are bonded together through the fourth bonding layer 147.

Then, in a second roller pressing step S6, the band-shaped electrode stack 100x having the band-shaped composite body 150 and the rectangular positive electrode plate 110 integrated is produced. Specifically, the positive electrode plate 110 that has been cut into a rectangular shape from the band-shaped positive electrode plate by a device (not shown) is placed on the second bonding layer 143 of the second separator 140 of the band-shaped composite body 150. Then, the band-shaped composite body 150 and the positive electrode plate 110 are pressed and integrated in the clearance between the third press roller 251 and the fourth press roller 253 of the second roller pressing unit 250. Thus, the band-shaped electrode stack 100x in which the band-shaped composite body 150 and the positive electrode plate 110 are bonded together through the second bonding layer 143 is formed.

Since the number of particles N2 (in this embodiment, N2=1.1×10$^7$ particles/cm$^2$) of the second polyethylene particles 144 per unit area of the second bonding layer 143 is smaller than the number of particles in the first bonding layer 133, a large pressing force is required to appropriately bond together the band-shaped composite body 150 and the positive electrode plate 110. However, roller pressing can easily apply a larger pressing force than flat pressing to the band-shaped composite body 150 and the positive electrode plate 110. Thus, the band-shaped composite body 150 and the positive electrode plate 110 can be appropriately bonded together in the second roller pressing step S6.

Thereafter, in a cutting step S7, the band-shaped electrode stack 100x is cut by the cutting unit 260 at predetermined intervals in the longitudinal direction to produce the rectangular electrode stacks 100.

Next, in a stacking step S8, the electrode stacks 100 are repeatedly bonded together by flat pressing to form the electrode assembly 20. Specifically, in the flat pressing unit 270, one electrode stack 100 is placed on another electrode stack 100 stacked earlier, such that the first bonding layer 133 of the first separator 130 of the one electrode stack 100 is placed on the positive electrode plate 110 of the other electrode stack 100. Then, the upper die 271 of the flat pressing unit 270 is lowered, and the plurality of electrode stacks 100 is flat-pressed between the upper die 271 and the lower die 273 to bond the one electrode stack 100 to the other electrode stack 100 through the first bonding layer 133. The process of thus bonding a new electrode stack 100 to another electrode stack 100 stacked earlier is performed a predetermined number of times to form the electrode assembly 20 having a plurality of electrode stacks 100 stacked and integrated.

As described above, the number of particles N1 (in this embodiment, N1=2.7×10$^8$ particles/cm$^2$) of the first polyethylene particles 134 per unit area of the first bonding layer 133 is larger than the number of particles N2 (in this embodiment, N2=1.1×10$^7$ particles/cm$^2$) of the second polyethylene particles 144 per unit area of the second bonding layer 143 (N1>N2) (see FIG. 2 and FIG. 3). Thus, when the electrode stacks 100 are bonded together through the first bonding layer 133 in the stacking step S8, the first polyethylene particles 134 of the first bonding layer 133 and the positive electrode plate 110 make contact with each other at a large number of points, which enhances the bonding strength between the first bonding layer 133 and the positive electrode plate 110.

On the other hand, when the number of particles N1 per unit area of the first bonding layer 133 is held constant, the bonding strength of the first bonding layer 133 increases according to the contact pressure applied to bond together the electrode stacks 100. Specifically, when this contact pressure is higher, the first polyethylene particles 134 of the first bonding layer 133 undergo more deformation, resulting in a larger contact area between the first bonding layer 133 and the positive electrode plate 110 and in greater bonding strength between the first bonding layer 133 and the positive electrode plate 110. Conversely, when this contact pressure is lower, the first polyethylene particles 134 undergo less deformation, resulting in a smaller contact area between the first bonding layer 133 and the positive electrode plate 110 and in weaker bonding strength between the first bonding layer 133 and the positive electrode plate 110.

In the electrode stack 100 of this embodiment, the number of particles N1 of the first polyethylene particles 134 per unit area of the first bonding layer 133 is larger than the number of particles in the second bonding layer 143, so that, when the electrode stacks 100 are bonded together through the first bonding layer 133, the first polyethylene particles 134 of the first bonding layer 133 and the positive electrode plate 110 make contact with each other at a large number of points, and the first bonding layer 133 exerts greater bonding strength than the second bonding layer 143. Therefore, even when the contact pressure applied to press and bond together the electrode stacks 100 is reduced, the first bonding layer 133 and the positive electrode plate 110 can be appropriately bonded together. Thus, the electrode stacks 100 can be appropriately bonded together by flat pressing in the stacking step S8.

Next, the battery 1 is assembled in an assembly step S9. Specifically, the case lid member 13 is prepared, and the positive electrode terminal member 50 and the negative electrode terminal member 60 are fixed to the case lid member 13 (see FIG. 5 and FIG. 6). Then, the positive electrode terminal member 50 and the negative electrode terminal member 60 are welded to the exposed positive electrode portion 110m of the positive electrode plate 110 and the exposed negative electrode portion 120m of the negative electrode plate 120, respectively, of the electrode assembly 20. Next, the electrode assembly 20 is covered in the insulating film enclosure 19 and inserted in this state into the case body member 11, and the opening of the case body member 11 is closed with the case lid member 13. The case body member 11 and the case lid member 13 are welded together to form the battery case 10. The electrolyte 17 is poured into the battery case 10 through an electrolyte inlet 13h to impregnate the electrode assembly 20 with the electrolyte 17. The electrolyte inlet 13h is then sealed with a sealing member 15. Thereafter, various inspections on the battery 1 are performed. Thus, the battery 1 is completed.

As has been described above, the manufacturing method of the battery 1 uses roller pressing to press and bond together the band-shaped composite body 150 and the positive electrode plate 110 through the second bonding layer 143 in the second roller pressing step S6. Since the number of particles N2 of the second polyethylene particles 144 per unit area of the second bonding layer 143 is smaller than the number of particles in the first bonding layer 133, a large pressing force is required to appropriately bond together the band-shaped composite body 150 and the positive electrode plate 110. However, roller pressing can easily apply a larger pressing force than flat pressing to the band-shaped composite body 150 and the positive electrode plate 110. Thus, the band-shaped composite body 150 and the positive electrode plate 110 can be appropriately bonded together by roller pressing.

On the other hand, this manufacturing method uses flat pressing to press and bond together the electrode stacks 100 through the first bonding layer 133 in the stacking step S8. Having the number of particles N1 of the first polyethylene particles 134 per unit area that is larger than the number of particles in the second bonding layer 143, the first bonding layer 133 can form an adequate bond even when the pressing force is reduced from that applied to bond together the band-shaped composite body 150 and the positive electrode plate 110, and therefore the electrode stacks 100 can be appropriately bonded together by flat pressing. Thus, it is possible to downsize the flat pressing unit 270 that performs flat pressing or increase the production rate, and thereby to reduce the manufacturing costs of the electrode assembly 20 and the battery 1 and realize an inexpensive battery 1.

Moreover, in this embodiment, the average particle size D1 of the first polyethylene particles 134 of the first bonding layer 133 is set to be smaller than the average particle size D2 of the second polyethylene particles 144 of the second bonding layer 143 (D1<D2). Thus, it is easy to dispose a large number of first polyethylene particles 134 per unit area of the first bonding layer 133, and to provide the first bonding layer 133 containing the large number of particles N1 of the first polyethylene particles per unit area.

In this embodiment, the average particle size D1 of the first polyethylene particles 134 of the first bonding layer 133 is set to 0.3 µm to 1.0 µm, which makes it easy to handle the first polyethylene particles 134 and to provide the first bonding layer 133 using the first polyethylene particles 134. Moreover, the average particle size D2 of the second polyethylene particles 144 of the second bonding layer 143 is set to 2.0 µm to 4.0 µm, which makes it easy to handle the second polyethylene particles 144 and to provide the second bonding layer 143 using the second polyethylene particles 144.

Test Result

Next, the result of a test conducted to verify the effects of the present disclosure will be described. As an example of the present disclosure, the electrode stacks 100 were formed by performing the process from the positive electrode plate formation step S1 to the cutting step S7 as in the above embodiment, and then the electrode stacks 100 were flat-pressed to integrate the electrode stacks 100 as in the stacking step S8 of the embodiment. During this process, the amount of misalignment between one electrode stack 100 stacked newly and another electrode stack 100 stacked earlier, specifically, the amount of misalignment (mm) therebetween in the direction in which the electrode stacks 100 were transferred to the flat pressing unit 270 (the left-right direction in FIG. 8) was measured. This measurement of the amount of misalignment was performed for each of 34 electrode stacks 100. The result is shown in the graph of FIG. 9.

On the other hand, as a comparative example, the first bonding layer 133 was formed in the first separator formation step S3 in the same manner as the second bonding layer 143 is formed in the second separator formation step S4. Specifically, in the first separator formation step S3, the second polyethylene particles 144 with the average particle size D2=3.0 µm and the binding agent 135 were dispersed in a dispersion medium (water), in a ratio of 95 wt % of the second polyethylene particles 144 to 5 wt % of the binding agent 135. The dispersion liquid thus produced was applied to the first principal surface 131a of the first separator body 131 and heated and dried to form a first bonding layer having a thickness of 5 µm.

As a result, the first bonding layer 133 according to the example had a large number of particles N1 of the first polyethylene particles 134 per unit area as shown in FIG. 2, while the first bonding layer according to the comparative example had a small number of particles of the polyethylene particles (second polyethylene particles 144) per unit area like the second bonding layer 143 shown in FIG. 3. For the electrode stacks according to the comparative example, too, the electrode stacks 100 are flat-pressed to integrate the electrode stacks 100 and the amount of misalignment (mm) that occurred in the process was measured as in the example. The value of the degree of contact pressure applied by flat pressing was the same in the example and the comparative example. The measurement result of the amounts of misalignment is shown in the graph of FIG. 9.

Figure 9:
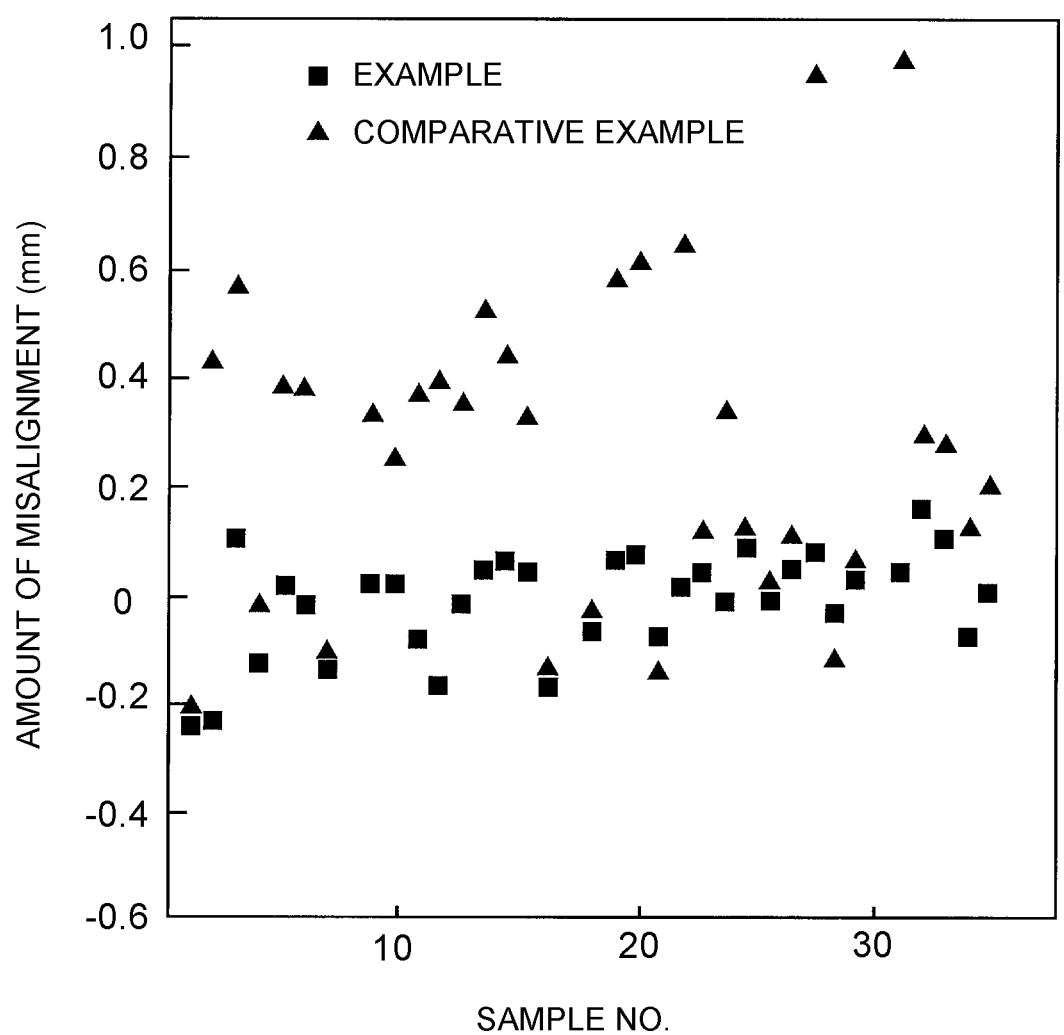
FIG. 9 is a graph showing amounts of misalignment that occurred when electrode stacks were stacked in each of an example and a comparative example.

As is clear from the graph of FIG. 9, in the case of the electrode stacks of the comparative example represented by triangles, large amounts of misalignment can occur between the electrode stacks in the stacking step S8 (misalignment of up to about 1.0 mm occurred). By comparison, in the case of the electrode stacks 100 of the example represented by the squares, the amounts of misalignment between the electrode stacks 100 are small (misalignment of up to as small as about 0.2 mm occurred). A possible reason for this result is as follows.

As described above, the first bonding layer of the electrode stack of the comparative example has a smaller number of particles of the polyethylene particles (second polyethylene particles 144) per unit area ($1.1 \times 10^7$ particles/$cm^2$, which is the same as the number of particles N2 in the second bonding layer 143; see FIG. 3). Therefore, when the electrode stacks are bonded together through the first bonding layer in the stacking step S8, the polyethylene particles (second polyethylene particles 144) of the first bonding layer and the positive electrode plate 110 make contact with each other at a small number of points, resulting in weak bonding strength between the first bonding layer and the positive electrode plate 110. This seems to be why the electrode stacks are likely to be displaced and a large amount of misalignment can occur when the electrode stacks are pressed between the upper die 271 and the lower die 273 of the flat pressing unit 270 and bonded together in the stacking step S8. It has been confirmed that increasing the contact pressure of flat pressing can reduce this amount of misalignment. However, increasing the contact pressure of flat pressing is not preferable, as it requires increasing the size of the flat pressing unit 270 or reducing the production rate in the stacking step S8, which causes an increase in the manufacturing costs of the electrode assembly 20 and the battery 1.

On the other hand, in the electrode stack 100 of the example, the number of particles N1 ($2.7 \times 10^8$ particles/cm$^2$) of the first polyethylene particles 134 per unit area of the first bonding layer 133 is larger than the number of particles N2 ($1.1 \times 10^7$ particles/cm$^2$) of the second bonding layer 143 as described above. Therefore, when the electrode stacks 100 are bonded together through the first bonding layer 133 in the stacking step S8, the first polyethylene particles 134 of the first bonding layer 133 and the positive electrode plate 110 make contact with each other at a large number of points, resulting in great bonding strength between the first bonding layer 133 and the positive electrode plate 110. This seems to be why, even when the pressing force in the stacking step S8 is reduced from the pressing force in the second roller pressing step S6, the electrode stacks 100 are less likely to be displaced and misalignment is less likely to occur when the electrode stacks 100 are pressed between the upper die 271 and the lower die 273 of the flat pressing unit 270 and bonded together in the stacking step S8.

While the present disclosure has been described above based on the embodiment, it should be understood that the present disclosure is not limited to the above embodiment but can be applied with modifications appropriately made thereto within the scope of the gist of the disclosure.

What is claimed is:

1. An electrode stack comprising:
   a first separator;
   a first electrode plate;
   a second separator; and
   a second electrode plate,
   wherein the first separator, the first electrode plate, the second separator, and the second electrode plate are stacked in this order and integrated,
   wherein the first separator has a first separator body including a porous membrane, and a porous first bonding layer that is formed on a principal surface of the first separator body, the principal surface of the first separator body being on an opposite side of the first separator body from the first electrode plate, the porous first bonding layer containing first polyethylene particles and a binding agent that binds the first polyethylene particles with each other as well as binds the first polyethylene particles and the first separator body with each other,
   wherein the second separator has a second separator body including a porous membrane, and a porous second bonding layer that is formed on a principal surface of the second separator body, the principal surface of the second separator body being on an opposite side of the second separator body from the first electrode plate and bonded to the second electrode plate, the porous second bonding layer containing second polyethylene particles and the binding agent that binds the second polyethylene particles with each other as well as binds the second polyethylene particles and the second separator body with each other, and
   wherein a number of particles of the first polyethylene particles per unit area of the first bonding layer is larger than a number of particles of the second polyethylene particles per unit area of the second bonding layer.

2. The electrode stack according to claim 1, wherein an average particle size of the first polyethylene particles is smaller than an average particle size of the second polyethylene particles.

3. The electrode stack according to claim 2,
   wherein the average particle size of the first polyethylene particles is 0.3 µm to 1.0 µm, and
   wherein the average particle size of the second polyethylene particles is 2.0 µm to 4.0 µm.

4. A battery manufacturing method,
   the battery including a stacked electrode assembly that is formed by stacking a plurality of electrode stacks each having a first separator, a first electrode plate, a second separator, and a second electrode plate stacked in this order and integrated,
   the first separator having a first separator body including a porous membrane, and a porous first bonding layer that is formed on a principal surface of the first separator body, the principal surface of the first separator body being on an opposite side of the first separator body from the first electrode plate, the porous first bonding layer containing first polyethylene particles and a binding agent that binds the first polyethylene particles with each other as well as binds the first polyethylene particles and the first separator body with each other,
   the second separator having a second separator body including a porous membrane, and a porous second bonding layer that is formed on a principal surface of the second separator body, the principal surface of the second separator body being on an opposite side of the second separator body from the first electrode plate and bonded to the second electrode plate, the porous second bonding layer containing second polyethylene particles and the binding agent that binds the second polyethylene particles with each other as well as binds the second polyethylene particles and the second separator body with each other,
   a number of particles of the first polyethylene particles per unit area of the first bonding layer being larger than a number of particles of the second polyethylene particles per unit area of the second bonding layer,
   the battery manufacturing method comprising:
      forming a band-shaped composite body having a band-shaped first separator, a band-shaped first electrode plate, and a band-shaped second separator that are to be respectively cut into the first separator, the first electrode plate, and the second separator, stacked in this order and integrated;
      producing a band-shaped electrode stack by placing the band-shaped composite body and the second electrode plate, with the second bonding layer of the band-shaped second separator of the band-shaped composite body and the second electrode plate on top of each other, and roller-pressing the band-shaped composite body and the second electrode plate so as to bond together the band-shaped composite body and the second electrode plate;
      forming the electrode stack of a predetermined shape by cutting the band-shaped electrode stack; and forming the electrode assembly by repeating a process of placing one electrode stack on another electrode stack, with the first bonding layer of the first separator of the one electrode stack on top of the second electrode plate of the other electrode stack, and flat-pressing the one electrode stack and the other electrode stack so as to bond the one electrode stack to the other electrode stack.

5. The battery manufacturing method according to claim 4, wherein an average particle size of the first polyethylene particles is smaller than an average particle size of the second polyethylene particles.

6. The battery manufacturing method according to claim 5, wherein the average particle size of the first polyethylene particles is 0.3 μm to 1.0 μm, and wherein the average particle size of the second polyethylene particles is 2.0 μm to 4.0 μm.

* * * * *